(12) United States Patent
Yokoyama

(10) Patent No.: US 11,755,117 B2
(45) Date of Patent: Sep. 12, 2023

(54) INFORMATION PROCESSING DEVICE, INFORMATION PROCESSING METHOD, AND SERVER DEVICE

(71) Applicant: SONY GROUP CORPORATION, Tokyo (JP)

(72) Inventor: Ryo Yokoyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/753,831

(22) PCT Filed: Sep. 11, 2020

(86) PCT No.: PCT/JP2020/034438
§ 371 (c)(1),
(2) Date: Mar. 16, 2022

(87) PCT Pub. No.: WO2021/060019
PCT Pub. Date: Apr. 1, 2021

(65) Prior Publication Data
US 2022/0334644 A1    Oct. 20, 2022

(30) Foreign Application Priority Data

Sep. 25, 2019   (JP) .................................. 2019-174078

(51) Int. Cl.
*G06F 3/01* (2006.01)
*G06F 3/04845* (2022.01)
*G06F 3/0488* (2022.01)

(52) U.S. Cl.
CPC ............ *G06F 3/016* (2013.01); *G06F 3/0488* (2013.01); *G06F 3/04845* (2013.01)

(58) Field of Classification Search
CPC ..... G06F 3/016; G06F 3/04845; G06F 3/0488
See application file for complete search history.

(56) References Cited

U.S. PATENT DOCUMENTS

| 8,674,961 B2 * | 3/2014 | Posamentier ........... G06F 3/041 345/173 |
| 9,239,622 B2 * | 1/2016 | Park ....................... G06F 3/0386 |
| 9,483,120 B2 * | 11/2016 | Park .................... G06F 3/03545 |
| 11,334,162 B2 * | 5/2022 | Sun ......................... G06F 3/016 |

(Continued)

FOREIGN PATENT DOCUMENTS

| CN | 101996413 A | 3/2011 |
| CN | 104035556 A | 9/2014 |

(Continued)

OTHER PUBLICATIONS

International Search Report and Written Opinion of PCT Application No. PCT/JP2020/034438, dated Nov. 32, 2020, 09 pages of ISRWO.

*Primary Examiner* — Tadesse Hailu
(74) *Attorney, Agent, or Firm* — CHIP LAW GROUP

(57) ABSTRACT

Provided are an information processing device, an information processing method, and a server device capable of presenting haptic information by using an existing data format. A smartphone includes a data processing unit that supplies a haptic control signal to a haptic presentation device on the basis of haptic control information embedded in image data in a predetermined file format.

18 Claims, 15 Drawing Sheets

(56) References Cited

U.S. PATENT DOCUMENTS

| | | | |
|---|---|---|---|
| 2008/0150911 A1* | 6/2008 | Harrison | G06F 3/04886 345/173 |
| 2009/0135164 A1* | 5/2009 | Kyung | G06F 3/016 345/173 |
| 2011/0032088 A1 | 2/2011 | Kim et al. | |
| 2012/0127088 A1* | 5/2012 | Pance | G06F 3/04812 345/173 |
| 2012/0206390 A1 | 8/2012 | Ueno et al. | |
| 2013/0307789 A1* | 11/2013 | Karamath | G06F 3/016 345/173 |
| 2014/0168124 A1* | 6/2014 | Park | G06F 3/016 345/173 |
| 2014/0258318 A1 | 9/2014 | Ullrich et al. | |
| 2014/0320436 A1* | 10/2014 | Modarres | G06F 1/1652 345/173 |
| 2016/0132118 A1* | 5/2016 | Park | G06F 3/038 345/173 |
| 2017/0090577 A1 | 3/2017 | Rihn | |
| 2020/0257364 A1* | 8/2020 | Strandberg | B60K 35/00 |
| 2020/0285316 A1* | 9/2020 | Park | G06F 3/0412 |

FOREIGN PATENT DOCUMENTS

| | | |
|---|---|---|
| CN | 107924235 A | 4/2018 |
| EP | 2775377 A2 | 9/2014 |
| JP | 2011-040067 A | 2/2011 |
| JP | 2012-181833 A | 9/2012 |
| JP | 2014-102654 A | 6/2014 |
| JP | 2014-174985 A | 9/2014 |
| JP | 2018-064264 A | 4/2018 |
| JP | 2018-528534 A | 9/2018 |
| KR | 10-2011-0016385 A | 2/2011 |
| KR | 10-2014-0109324 A | 9/2014 |
| KR | 10-2018-0048629 A | 5/2018 |
| WO | 2017/053761 A1 | 3/2017 |

* cited by examiner

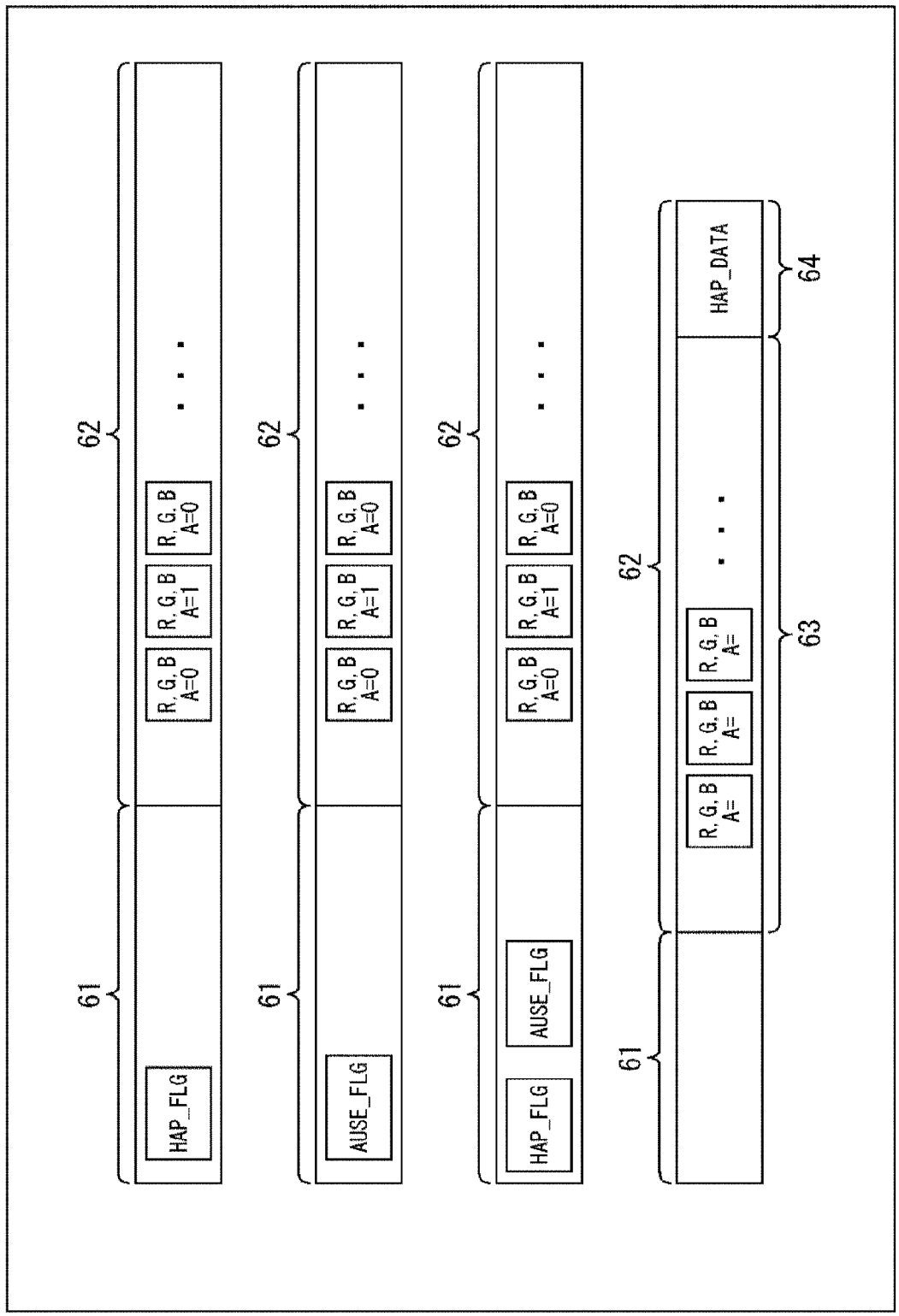

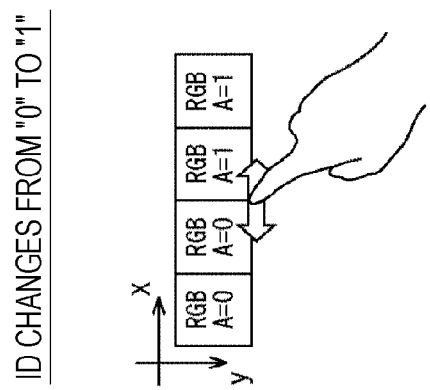
FIG. 7A
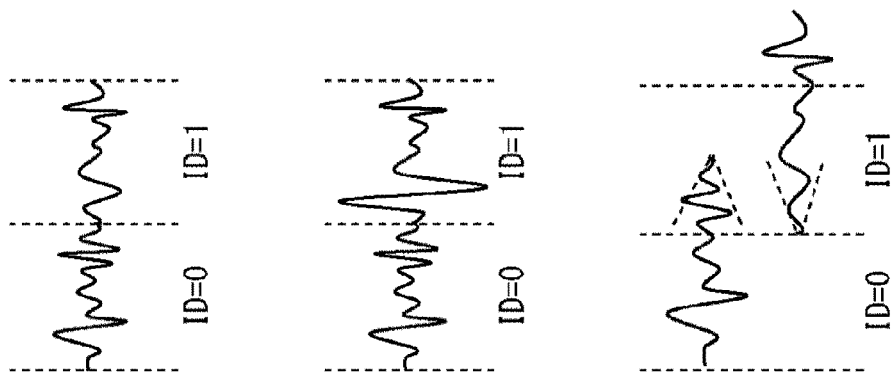
FIG. 7B
FIG. 7C
FIG. 7D

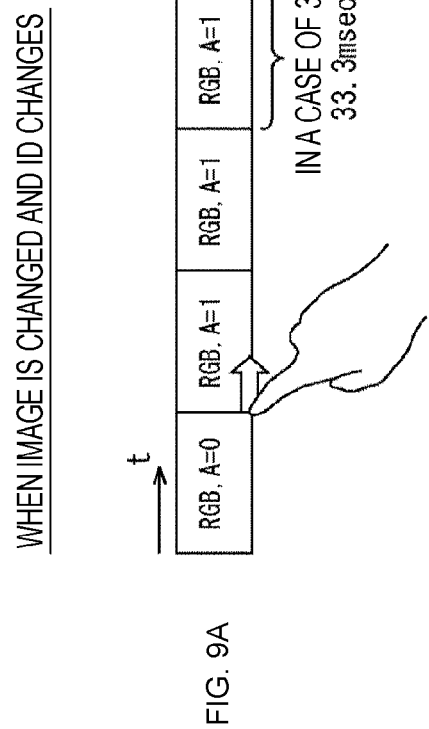
FIG. 9A
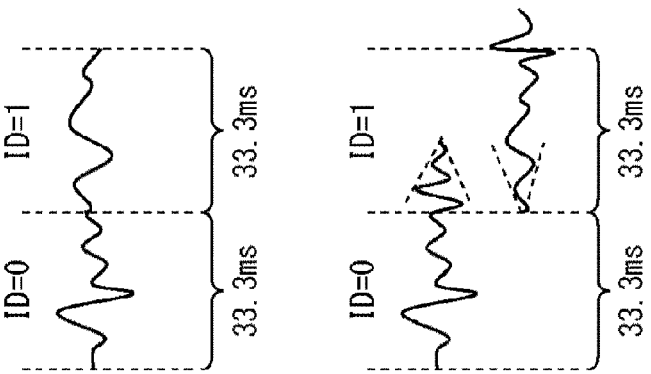
FIG. 9B
FIG. 9C

INFORMATION PROCESSING DEVICE, INFORMATION PROCESSING METHOD, AND SERVER DEVICE

CROSS REFERENCE TO RELATED APPLICATIONS

This application is a U.S. National Phase of International Patent Application No. PCT/JP2020/034438 filed on Sep. 11, 2020, which claims priority benefit of Japanese Patent Application No. JP 2019-174078 filed in the Japan Patent Office on Sep. 25, 2019. Each of the above-referenced applications is hereby incorporated herein by reference in its entirety.

TECHNICAL FIELD

The present technology relates to an information processing device, an information processing method, a server device, and a program, and more particularly relates to an information processing device, an information processing method, a server device, and a program capable of presenting haptic information by using an existing data format.

BACKGROUND ART

Various technologies for presenting haptic stimulation such as vibration to a user have been conventionally proposed. For example, there is disclosed a technology of generating a vibration waveform on the basis of a feature value extracted from a stereo audio signal and presenting a haptic stimulation (see, for example, Patent Document 1).

CITATION LIST

Patent Document

Patent Document 1: Japanese Patent Application Laid-Open No. 2018-64264

SUMMARY OF THE INVENTION

Problems to be Solved by the Invention

In some cases, it is desired to, for example, transmit haptic information according to texture or the like of an image from a transmission side such as a server to a terminal and present the haptic information to the user, instead of generating the haptic information in the terminal itself.

However, in a case where a new data format including the haptic information is defined, compatible devices are limited.

The present technology has been made in view of such a situation and can present haptic information by using an existing data format.

Solutions to Problems

An information processing device according to a first aspect of the present technology includes a data processing unit configured to supply a haptic control signal to a haptic presentation device on the basis of haptic control information embedded in image data in a predetermined file format.

An information processing method according to the first aspect of the present technology includes causing an information processing device to supply a haptic control signal to a haptic presentation device on the basis of haptic control information embedded in image data in a predetermined file format.

A program according to the first aspect of the present technology causes a computer to function as a data processing unit configured to supply a haptic control signal to a haptic presentation device on the basis of haptic control information embedded in image data in a predetermined file format.

In the first aspect of the present technology, a haptic control signal is supplied to the haptic presentation device on the basis of haptic control information embedded in image data in a predetermined file format.

A server device according to a second aspect of the present technology includes: a storage unit configured to store image data in a predetermined file format in which haptic control information is embedded; and a communication unit configured to transmit the image data to a predetermined information processing device in response to a request from the predetermined information processing device.

In the second aspect of the present technology, image data in a predetermined file format in which haptic control information is embedded is stored, and the image data is transmitted to the predetermined information processing device in response to a request from the predetermined information processing device.

Note that the program can be provided by being transmitted via a transmission medium or by being recorded on a recording medium.

The information processing device and the server device may be independent devices or may be internal blocks forming a single device.

BRIEF DESCRIPTION OF DRAWINGS

FIGS. 6A, 6B, 6C, and 6D are explanatory diagrams of a file format of image data in which haptic data is embedded.

FIGS. 7A, 7B, 7C, and 7D are explanatory diagrams of control of a haptic presentation device based on haptic data.

FIGS. 9A, 9B, and 9C are explanatory diagrams of control of a haptic presentation device based on haptic data.

MODE FOR CARRYING OUT THE INVENTION

Figure 1:
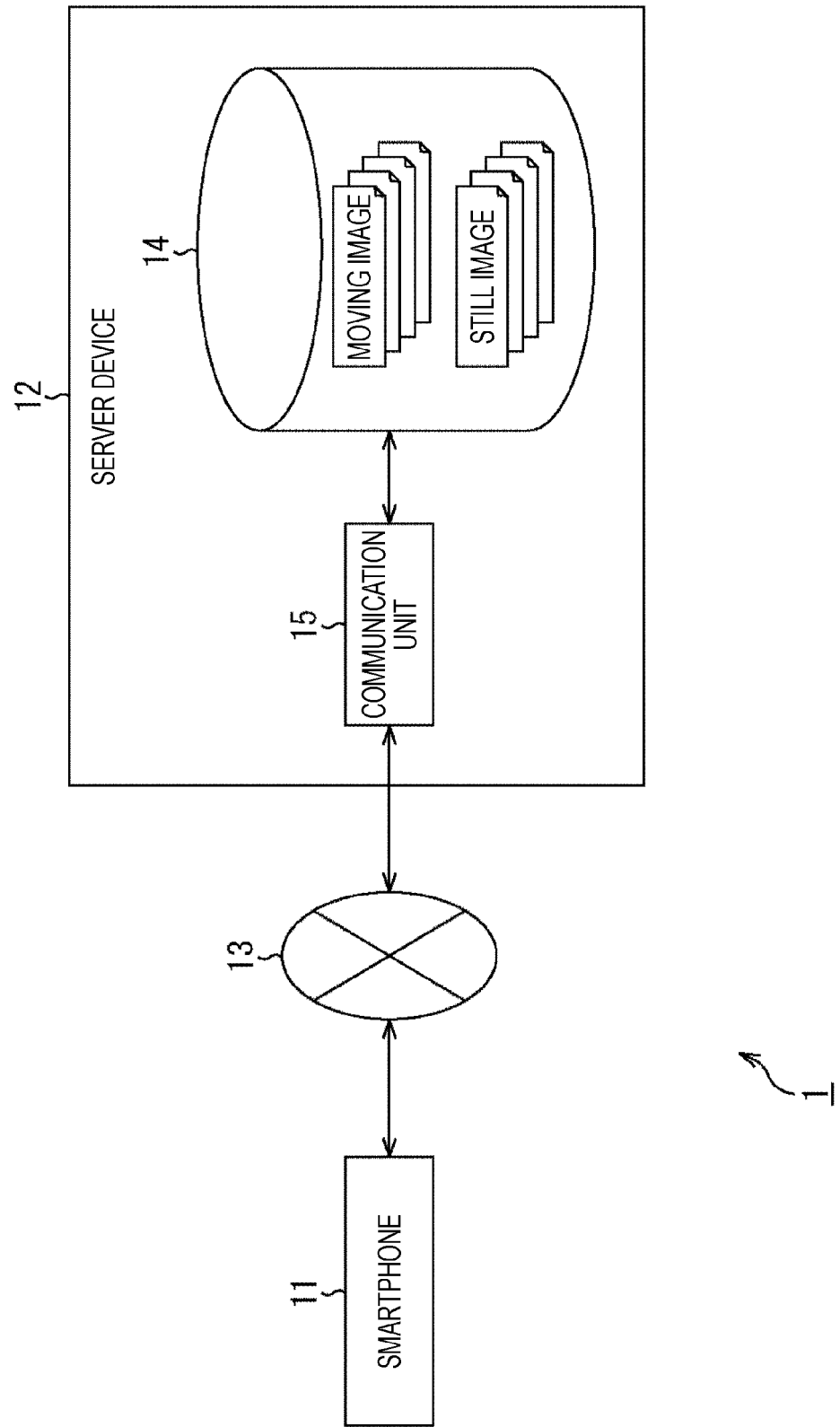
FIG. 1 is a block diagram illustrating a configuration example of a first embodiment of an image processing system to which the present technology is applied.

Hereinafter, modes for carrying out the present technology (hereinafter, referred to as "embodiments") will be described with reference to the accompanying drawings. Note that, in this specification and the drawings, components having substantially the same functional configurations will be represented as the same reference signs, and repeated description thereof will be omitted. Description will be provided in the following order.

1. Configuration example of first embodiment of image processing system
2. Functional block diagram of smartphone
3. File format of image data with haptic information
4. Control of haptic presentation device
5. Flowchart of haptic control processing
6. Modification examples
7. Configuration example of second embodiment of image processing system
8. Configuration example of computer

1. Configuration Example of First Embodiment of Image Processing System

FIG. 1 illustrates a configuration example of a first embodiment of an image processing system to which the present technology is applied.

An image processing system 1 illustrated in FIG. 1 includes a smartphone 11 and a server device 12, and the smartphone 11 and the server device 12 are connected via a network 13.

The smartphone 11 is a terminal device (information processing device) operated by a user. The smartphone 11 accesses the server device 12 via the network 13 in response to a user operation, acquires image data stored in the server device 12, and displays an image on its own display. The image displayed on the display may be a moving image or a still image.

The server device 12 includes a storage unit 14 and a communication unit 15. The storage unit 14 stores image data of one or more moving images and image data of one or more still images. In response to a request from the smartphone 11, the communication unit 15 transmits the image data of the moving image or still image stored in the storage unit 14 to the smartphone 11. Note that the server device 12 may store only either one of the image data of the moving images or the image data of the still images.

The network 13 is an arbitrary communication network and may be a communication network of wired communication or a communication network of wireless communication or may include both of them. Further, the network 13 may include a single communication network or a plurality of communication networks. The network 13 may include, for example, the Internet, a public telephone network, a wide area network for wireless mobile bodies such as a so-called 4G network or 5G network, a wide area network (WAN), a local area network (LAN), and the like. Further, the network 13 may include a dedicated network such as the Internet protocol-virtual private network (IP-VPN). Further, the network 13 may include a communication network or communication path of an arbitrary communication standard, such as a wireless communication network that performs communication conforming to the Bluetooth (registered trademark) standard, a communication path of short-range wireless communication such as near field communication (NFC), a communication path of infrared communication, or a communication network of wired communication conforming to high-definition multimedia interface (HDMI (registered trademark)), universal serial bus (USB), or other standards.

Note that, because the image processing system 1 of FIG. 1 has a configuration focused on a single user, only one smartphone 11 and one server device 12 are connected via the network 13. However, the image processing system 1 can have a configuration including a plurality of smartphones 11. Further, the server device 12 can be divided into two or more server devices depending on the kind of image data to be stored, a connection device, or the like. Furthermore, the server device 12 is only required to have an image data storage function and a communication function and achieve a server function and may be configured by, for example, a personal computer, a smartphone, or the like.

Haptic control information is embedded in the image data of the moving image and the image data of the still image stored in the server device 12. Hereinafter, the image data in a predetermined file format in which the haptic control information is embedded, which is stored in the server device 12, will be referred to as "image data with haptic information".

Figure 2:
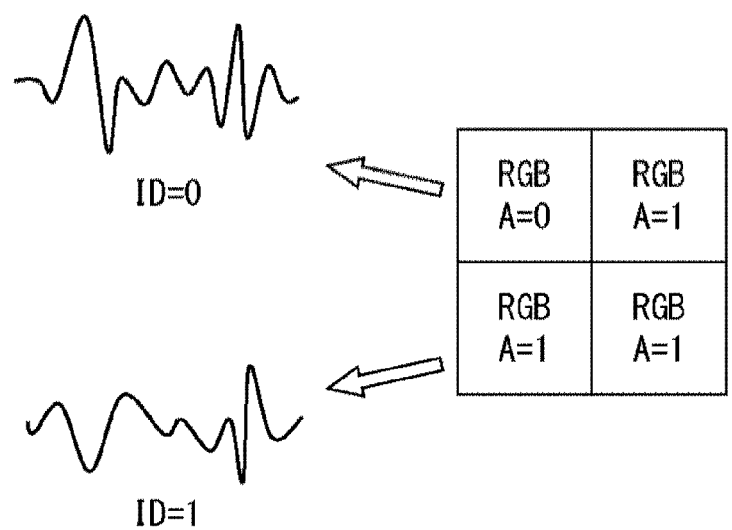
FIG. 2 illustrates an example of image data with haptic information.

FIG. 2 illustrates an example of the image data with haptic information.

In the image data with haptic information supplied from the server device 12, for example, as illustrated in FIG. 2, RGB texture information (color information) and haptic data A serving as the haptic control information are stored for each pixel. The haptic data A represents a haptic ID (haptic identification information) for identifying a haptic control signal. For example, in a case where the haptic data A stored in a certain pixel is 0 (A=0), this indicates that a haptic control signal for the haptic ID=0 is used. Further, for example, in a case where the haptic data A stored in a certain pixel is 1 (A=1), this indicates that a haptic control signal for the haptic ID=1 is used. The haptic control signal is, for example, a signal for driving a haptic presentation device such as a piezoelectric element and corresponds to a vibration waveform in a predetermined period.

Figure 3:
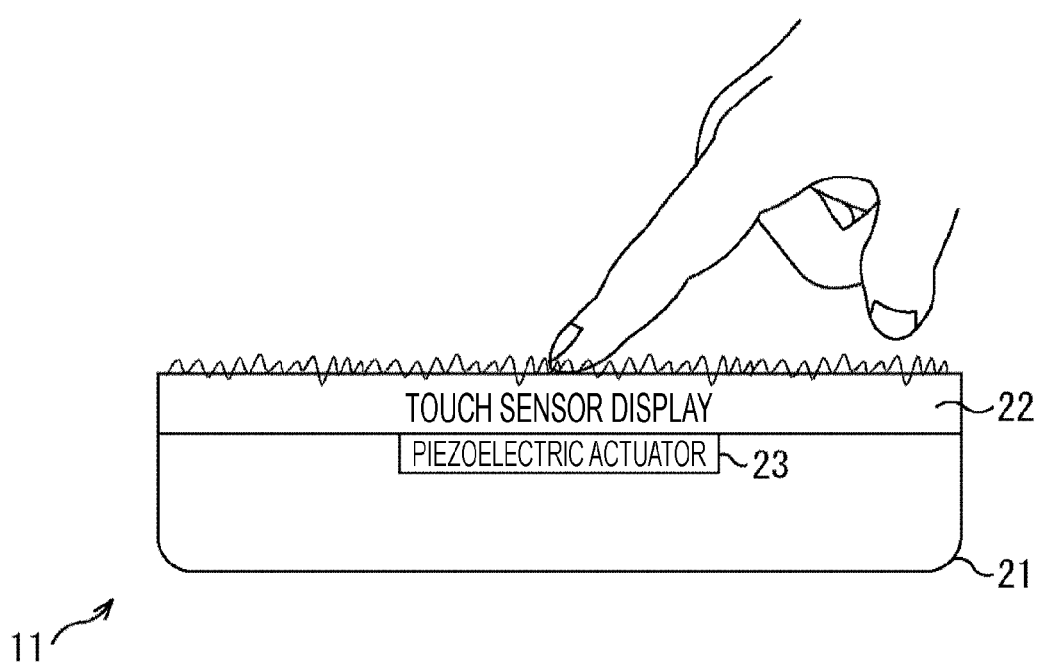
FIG. 3 is a cross-sectional view illustrating a haptic presentation mechanism of a smartphone.

FIG. 3 is a cross-sectional view illustrating a haptic presentation mechanism of the smartphone 11.

The smartphone 11 includes a touch sensor display 22 (hereinafter, also simply referred to as "display") placed on a predetermined surface of a main body (housing) 21 and a piezoelectric actuator 23 attached to a back surface of the display 22 opposite to a user operation surface. The haptic control signal is, for example, a signal for driving the piezoelectric actuator 23 serving as the haptic presentation device.

The smartphone 11 displays an image on the display 22 on the basis of the texture information of the image data with haptic information and supplies a haptic control signal corresponding to the haptic data A to the piezoelectric actuator 23 in accordance with a position (pixel position) on the image touched by the user, thereby vibrating the display 22.

Figure 4:
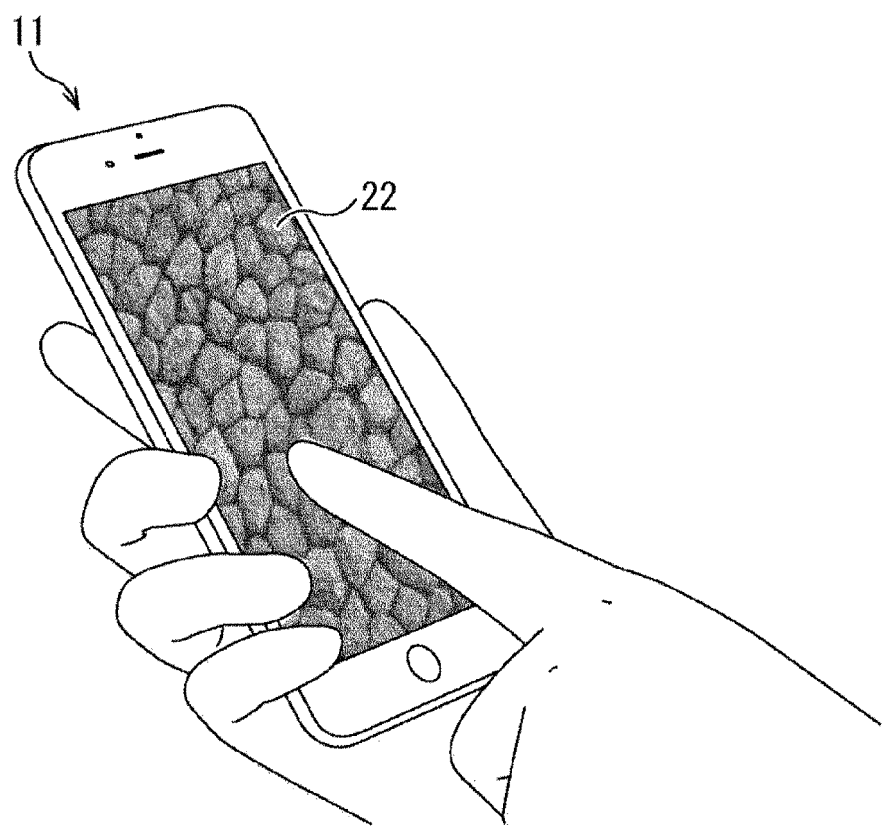
FIG. 4 is an explanatory diagram of an operation of a smartphone.

As a result, as illustrated in FIG. 4, in a case where the user touches or traces a predetermined position on the image displayed on the display 22, the user can feel a haptic sensation such as a feeling of material of the image displayed on the display 22.

Note that a haptic sensation generation method of generating a haptic sensation may be a method of generating a haptic sensation by vibration as in the piezoelectric actuator 23 described above or may be a method of generating a haptic sensation by electrical stimulation.

2. Functional Block Diagram of Smartphone

Figure 5:
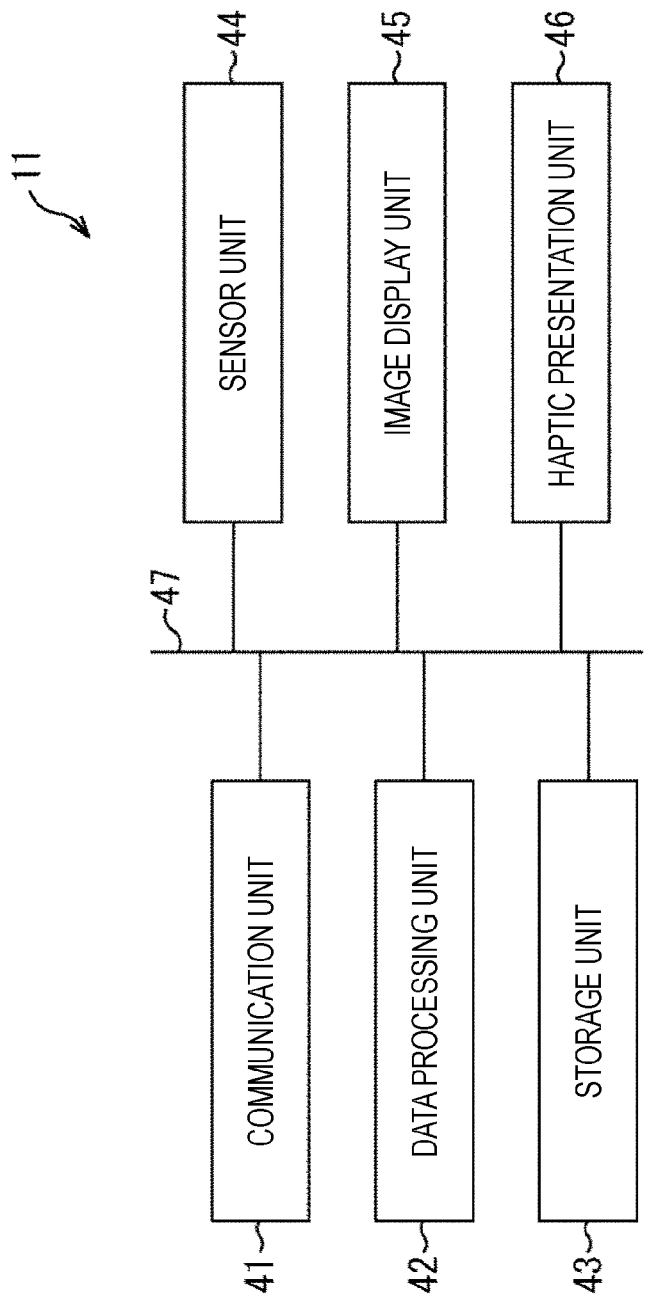
FIG. 5 is a functional block diagram of a smartphone.

FIG. 5 is a functional block diagram of the smartphone 11 regarding haptic control of not only displaying an image on the display 22 but also causing the user to perceive a haptic sensation of the image.

The smartphone 11 includes a communication unit 41, a data processing unit 42, a storage unit 43, a sensor unit 44, an image display unit 45, and a haptic presentation unit 46. The communication unit 41, the data processing unit 42, the storage unit 43, the sensor unit 44, the image display unit 45, and the haptic presentation unit 46 are connected to one another via a predetermined bus 47.

The communication unit 41 includes, for example, a network interface connectable to the network 13 and communicates with the server device 12.

The communication unit 41 is connected to the server device 12 via the network 13 under the control of the data processing unit 42 and acquires (receives) image data in a predetermined file format in which haptic data is embedded. The acquired image data is supplied to the data processing unit 42 or the storage unit 43.

Further, the communication unit 41 can also transmit image data with haptic information stored in the storage unit 43 to the server device 12 via the network 13 under the control of the data processing unit 42.

The user can upload, to the server device 12, image data with haptic information stored in advance in the user's own smartphone 11, image data with haptic information acquired from another device (another user) or the like, and other image data. Further, in a case where the smartphone 11 has a function of creating image data with haptic information, the image data with haptic information created by the smartphone itself may also be uploaded. The server device 12 receives image data with haptic information transmitted from each of a plurality of devices including the smartphone 11 and stores the image data with haptic information in the storage unit 14 (FIG. 1).

The data processing unit 42 includes, for example, an arithmetic processing unit and a data storage unit, such as a central processing unit (CPU), a read only memory (ROM), and a random access memory (RAM).

The data processing unit 42 supplies a haptic control signal to the haptic presentation unit 46 on the basis of the haptic data embedded in the image data with haptic information in the predetermined file format. More specifically, the data processing unit 42 acquires a haptic control signal from the storage unit 43 and supplies the haptic control signal to the haptic presentation unit 46, the haptic control signal being based on the haptic data A corresponding to the user's touch position on an image displayed on the basis of the image data with haptic information. The user's touch position on the image is supplied from the sensor unit 44 as a touch position on the image display unit 45 (display 22).

The storage unit 43 includes, for example, a storage medium such as a hard disk or a nonvolatile memory.

The storage unit 43 stores the image data with haptic information acquired from the server device 12. Further, the storage unit 43 may store not only the image data with haptic information acquired from the server device 12 but also image data with haptic information in advance.

Further, the storage unit 43 stores in advance a haptic control signal corresponding to the haptic ID embedded as the haptic data A in the image data with haptic information.

Note that the haptic control signal corresponding to the haptic data A (haptic ID) included in the image data with haptic information is stored in the server device 12, is acquired when the image data with haptic information is acquired or in advance at a different timing from that when the image data with haptic information is acquired, and is stored in the storage unit 43. Alternatively, the haptic control signal corresponding to the haptic data A (haptic ID) may be stored in a server device or the like other than the server device 12.

The sensor unit 44 senses the user's touch position on the image displayed on the image display unit 45. The sensor unit 44 includes, for example, a touch sensor overlaid on the display 22. The sensor unit 44 senses the user's touch position on the display 22 and supplies a sensing result to the data processing unit 42.

The image display unit 45 includes, for example, a liquid crystal display (LCD), an organic light emitting diode (OLED) display, or the like. The image display unit 45 displays an image corresponding to the image data supplied from the data processing unit 42.

The haptic presentation unit 46 includes, for example, a vibration generation device of a piezoelectric actuator 23 including a piezoelectric element. The haptic presentation unit 46 is a haptic presentation device that presents a haptic sensation to the user.

The touch sensor display 22 and the piezoelectric actuator 23 in FIG. 3 correspond to the sensor unit 44, the image display unit 45, and the haptic presentation unit 46 in FIG. 5.

3. File Format of Image Data with Haptic Information

FIGS. 6A, 6B, 6C, and 6D illustrate an example of a file format of image data in which haptic data is embedded.

Image data with haptic information can be transmitted by using, for example, a portable network graphics (PNG) file format.

In the PNG file format, a parameter called α channel that specifies transparency can be stored for each pixel. This α channel area is used as a parameter not for storing the transparency but for storing the haptic data A. The transparency is a parameter that is not necessarily used, and thus it is possible to transmit the haptic data A by using the parameter.

Specifically, as illustrated in FIG. 6A, a file in the PNG format includes a header 61 and data 62, and the data 62 stores the RGB texture information (color information) and the haptic data A in units of pixels. The haptic data A is stored in the α channel area. The α channel is not limited to binary values of "0" and "1" and can be defined by 8 bits (256 grayscales). A fine haptic sensation can be reproduced by embedding, in each pixel, the haptic data A as the haptic control information for controlling the haptic presentation device.

The header 61 can store, as metadata describing information regarding data, a haptic data flag HAP_FLG indicating whether the data stored in the α channel area is transparency or haptic data. For example, HAP_FLG=1 indicates that the data stored in the α channel area is the haptic data, whereas HAP_FLG=0 indicates that the data stored in the α channel area is the transparency. Therefore, a reproduction-side application (program) that has acquired the file can determine whether to process the α channel as the transparency or as the haptic data.

Further, as illustrated in FIG. 6B, the header 61 may include a haptic use flag AUSE_FLG that specifies whether or not to use the data stored in the α channel area. Therefore, in a case where the reproduction-side application that has acquired the file does not support control using the haptic data, it is possible to prevent the use of the haptic data stored in the α channel on the basis of the haptic use flag AUSE_FLG.

Further, as illustrated in FIG. 6C, the header 61 may store both the haptic data flag HAP_FLG indicating the transparency or the haptic data and the haptic use flag AUSE_FLG that specifies whether or not to use the data stored in the α channel area.

In the above description, an example of PNG has been described as a file format having the α channel. However, the α channel area can also similarly be applied as an area for storing the haptic data in other file formats having the α channel other than PNG, such as, for example, Audio Video Interleave (AVI) and QuickTime. The existing file format having the α channel is adopted as a file format for transmitting the image data with haptic information, and therefore it is possible to present haptic information by using the existing data format, without needing to prepare a special data format or develop a new data format. Using a mechanism of the existing file format facilitates transmission and reception of data between devices, such as distribution thereof from the server device 12.

Note that the present technology is not limited to a file format having the α channel as a file format of the image data with haptic information. For example, as illustrated in FIG. 6D, even a file format having the α channel does not store the haptic data A in the α channel area, but may store, for example, haptic data (HAP_DATA) 64 for all the pixels in the data 62 in such a way that the haptic data 64 is added to the end of pixel data 63 stored in the existing format. Alternatively, the haptic data 64 may be placed before the pixel data 63 stored in the existing format in the data 62 or may be placed before the header 61. Further, the haptic data may be stored in an area (free description area) where an application can freely describe data, such as an application extension area of the header 61. Note that, needless to say, the method of storing haptic data described with reference to FIG. 6D is also applicable to a file in a file format having no α channel.

In the example described above, it has been described that the haptic data A is stored in units of pixels. However, the haptic data A may be stored not in units of one pixel but in units of a plurality of pixels (for each set of a plurality of pixels) in both horizontal and vertical directions. In a case where a pixel having no haptic data A is touched by the user, the data processing unit 42 can supply a haptic control signal to the haptic presentation unit 46 by using the haptic data A of one or more pixels having the haptic data A around the touch position.

Further, in a case where the image data with haptic information is image data of a moving image, the haptic data A may be stored in units of one frame or in units of a plurality of frames. In this case, the haptic data A of an adjacent image can be used for the haptic data A of an image in which no haptic data A is stored.

Further, the haptic data A may be stored in units of a plurality of frames and may also be stored in units of a plurality of pixels in an image in which the haptic data A is stored.

In the example described above, the haptic ID for identifying a haptic control signal is embedded in the α channel of each pixel. However, the haptic control signal itself may be embedded therein. Further, the haptic control signal embedded in the α channel may not be a waveform having a time width as illustrated in FIG. 2, but be data such as an instantaneous value, for example, a haptic stimulation value obtained by quantifying intensity of haptic stimulation. Furthermore, the haptic ID may be embedded in the α channel of each pixel, and the haptic control signal may be embedded in another place such as the header 61 or the haptic data 64 after the pixel data 63 in FIG. 6D.

The number of pieces of haptic data A (haptic IDs) embedded in the α channel of each pixel is not limited to one, and a plurality of pieces of haptic data A (haptic IDs) may be embedded therein. For example, it is possible to perform control such that three pieces of haptic data A1 to A3 corresponding to three vibration modes of strong, medium, and weak are embedded in the α channel and a haptic control signal of one of the pieces of haptic data A1 to A3 corresponding to a vibration mode set by the user is acquired and supplied to the haptic presentation device.

4. Control of Haptic Presentation Device

Control of the haptic presentation device based on the haptic data A will be described with reference to FIGS. 7A, 7B, 7C, 7D, 8A, 8B, 9A, 9B, 9C, and 9D.

FIGS. 7A, 7B, 7C, 7D, 8A, and 8B illustrate examples where the data processing unit 42 controls the haptic presentation device in a case where the user performs an operation of tracing (sliding) the image displayed on the display 22.

FIG. 7A illustrates a state in which the user performs an operation of tracing the image displayed on the display 22 and the haptic data A (haptic ID) of a pixel touched by the user changes from "0" to "1".

In a case where the haptic data A (haptic ID) of the pixel touched by the user changes from "0" to "1", as the most basic control, the data processing unit 42 can perform control to switch a haptic control signal corresponding to the haptic ID at the moment when the haptic ID changes, as illustrated in FIG. 7B.

Further, for example, as illustrated in FIG. 7C, the data processing unit 42 can perform control to switch a haptic control signal corresponding to the haptic ID by controlling an output level (amplitude) of the start of the next haptic control signal (of the next haptic ID) in accordance with a moving speed of a finger at the moment of switching. Specifically, in a case where the haptic data A (haptic ID) changes from "0" to "1" while the moving speed of the finger rapidly changes, the data processing unit 42 increases the output level of the start of the haptic control signal, whereas, in a case where the haptic data A (haptic ID) changes from "0" to "1" while the moving speed of the finger slowly changes, the data processing unit 42 decreases the output level of the start of the haptic control signal. FIG. 7C shows a graph of an example where the output level is greatly changed.

Note that, in a case where the moving speed of the finger is high, time for touching the pixel becomes short, and thus, a pitch (reproduction speed) of the output level of the haptic control signal may be controlled according to the moving speed. Specifically, in a case where the moving speed of the finger is high, the data processing unit 42 increases the pitch (reproduction speed) of the output level of the haptic control signal. Meanwhile, in a case where the moving speed of the finger is low, the data processing unit 42 decreases the pitch (reproduction speed) of the output level of the haptic control signal. The control of the pitch (reproduction speed) will also be described later with reference to FIG. 8B.

In a case where the moving speed of the finger is high and the output level (amplitude) of the haptic control signal is decreased in accordance with the moving speed, the output level may become lower than a sensing level of the user. Thus, a sufficient haptic sensation may not be given. Therefore, the output level of the haptic control signal can have a lower limit value.

Further, for example, as illustrated in FIG. 7D, the data processing unit 42 can perform control to switch haptic control signals by fading out the haptic control signal whose haptic data has not been changed from "0" to "1" while fading in the changed haptic control signal.

Figure 8B:
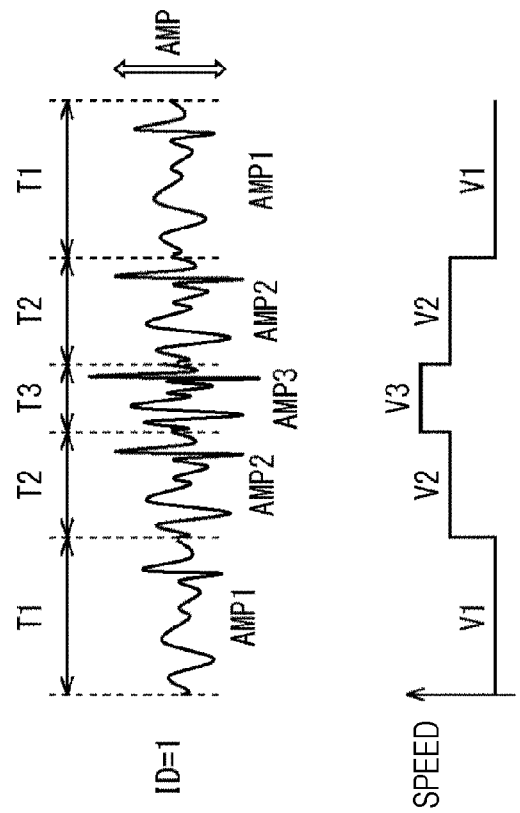
FIGS. 8A and 8B are explanatory diagrams of control of a haptic presentation device based on haptic data.
Figure 8A:
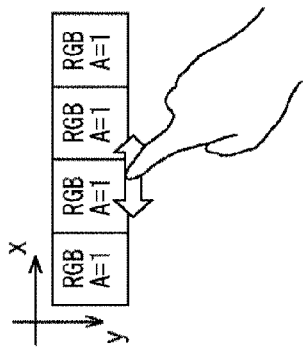

FIG. 8A illustrates a state in which the user performs an operation of tracing the image displayed on the display 22 and the haptic data A (haptic ID) of a pixel touched by the user remains "1".

In this case, for example, the data processing unit 42 can perform control to switch haptic control signals by controlling the output level (amplitude) and pitch (reproduction speed) of the start of the next haptic control signal (of the next haptic ID) in accordance with the moving speed of the finger at the time of crossing over pixels.

For example, as illustrated in FIG. 8B, an operation of tracing five pixels having the haptic data A (haptic ID) of "1" in order is detected, and the speed at the time of crossing over pixels is in the following order: V1, V2, V3, V2, and V1 (V1<V2<V3).

In a case where the moving speed of the finger at the time of crossing over pixels is high, the data processing unit 42 increases the output level (amplitude) and the pitch (reproduction speed) of the haptic control signal. Meanwhile, in a case where the moving speed of the finger at the time of crossing over pixels is low, the data processing unit 42 decreases the output level (amplitude) and the pitch (reproduction speed) of the haptic control signal.

In the example of the haptic control signals in FIG. 8B, sections of the respective haptic control signals corresponding to the pitches are T1, T2, T3, T2, and T1 (T3<T2<T1), which correspond to the speed V1, V2, V3, V2, and V1, respectively. Further, the output levels (amplitudes) are also speed AMP1, AMP2, AMP3, AMP2, and AMP1 (AMP1<AMP2<AMP3), which correspond to the speed V1, V2, V3, V2, and V1, respectively.

The operation example illustrated in FIGS. 7A, 7B, 7C, and 7D is an are examples where the haptic data A (haptic ID) of the pixel is changed by the operation of tracing the image displayed on the display 22 by the user, i.e., the user's active operation. However, the haptic data A (haptic ID) of the pixel may be passively changed. Specifically, in a case where the image data with haptic information is a moving image, even if the user touches the same pixel position without moving the finger, the image may be changed and the haptic data A (haptic ID) stored in the pixel at the touch position may be changed.

FIG. 9A illustrates a state in which the image is changed and the haptic data A (haptic ID) stored in the pixel at the touch position changes from "0" to "1".

FIGS. 7A and 8A, a direction of the horizontal axis represents an X position on the display 22, but, in FIG. 9A, the direction of the horizontal axis represents a time direction. In a case where a frame rate is 30 fps, the image is updated every about 33.3 msec.

In a case where the haptic data A (haptic ID) stored in the pixel at the touch position changes from "0" to "1" due to the change of the image, as the most basic control, the data processing unit 42 can perform control to switch a haptic control signal corresponding to the haptic ID at the moment when the haptic ID changes, as illustrated in FIG. 9B.

Alternatively, as illustrated in FIG. 9C, the data processing unit 42 can perform control to switch haptic control signals by fading out the haptic control signal whose haptic data has not been changed from "0" to "1" while fading in the changed haptic control signal.

Figure 10:
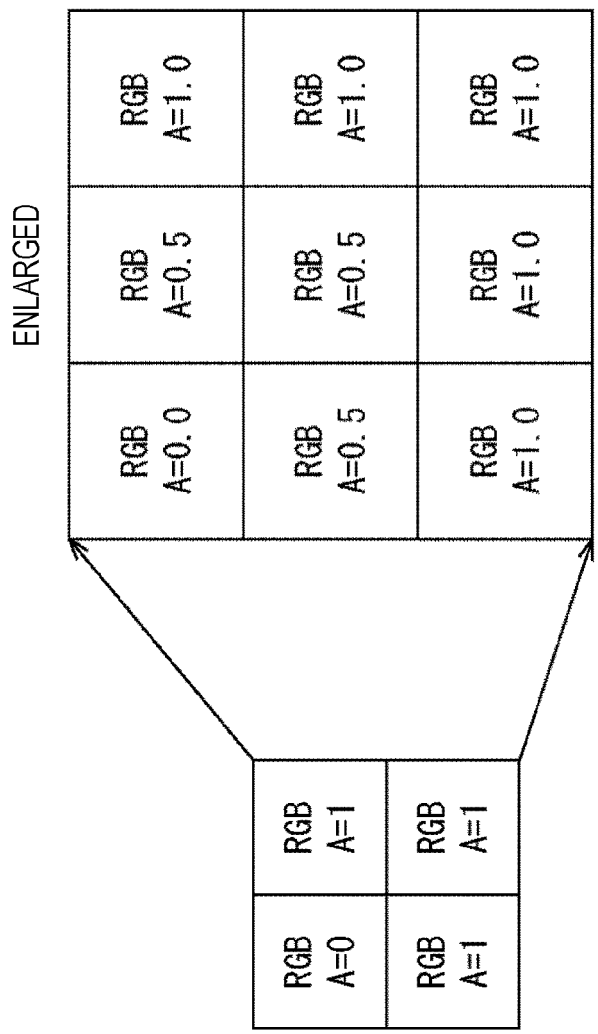
FIG. 10 illustrates processing performed in a case where an image is enlarged.

FIG. 10 illustrates processing of the haptic data A (haptic ID) performed in a case where the user performs, for example, a pinch-out operation on the image displayed on the display 22 to enlarge the image displayed on the display 22.

In a case where the image is enlarged, it is possible to perform standard image enlargement processing of a drawing application as it is on the haptic data A as in a case of the α channel, thereby generating haptic data A of each enlarged pixel. In a case where a new pixel is generated by interpolation between a pixel of the haptic data A="0" and a pixel of the haptic data A="1" because of the enlargement of the image, the haptic data A of the pixel generated by interpolation is generated by interpolation to be, for example, the haptic data A="0.5" by using the haptic data A="0" and the haptic data A=

In a case where the pixel of the haptic data A="0.5" is touched by the user, the data processing unit 42 can generate a haptic control signal obtained by superimposing a haptic control signal for the haptic ID="0" and a haptic control signal for the haptic ID="1" as a haptic control signal for the pixel having the haptic data A="0.5" and supply the haptic control signal to the haptic presentation device.

Further, in a case where the user performs a pinch-in operation or the like to reduce the image, it is possible to perform standard image reduction processing of a drawing application as it is on the haptic data A as in a case of the α channel, thereby generating haptic data A of each reduced pixel. For example, in a case where a plurality of pixels is reduced to one pixel, pixels to be reduced are omitted, or an average value of the haptic data A of the plurality of pixels to be aggregated is set as the haptic data A or the like of the aggregated pixel.

In a case where the haptic data A of a pixel becomes third haptic data A3 between first haptic data A1 and second haptic data A2 in accordance with enlargement or reduction of the image, the data processing unit 42 can generate a signal obtained by superimposing a haptic control signal corresponding to the first haptic data A1 and a haptic control signal corresponding to the second haptic data A2 and supply the signal to the haptic presentation device.

Because the α channel of a pixel is used for the haptic data A for controlling the haptic presentation device, it is possible to perform processing by using standard image enlargement processing of a drawing application as it is, without needing special processing at the time of enlargement or reduction processing of the image, which is easily applicable.

5. Flowchart of Haptic Control Processing

Haptic control processing in which the smartphone 11 causes the user to perceive haptic information according to a touch position on an image will be described with reference to a flowchart of FIG. 11. This processing is started when, for example, the user instructs the smartphone 11 to perform an operation of acquiring image data with haptic information stored in the server device 12.

Figure 11:
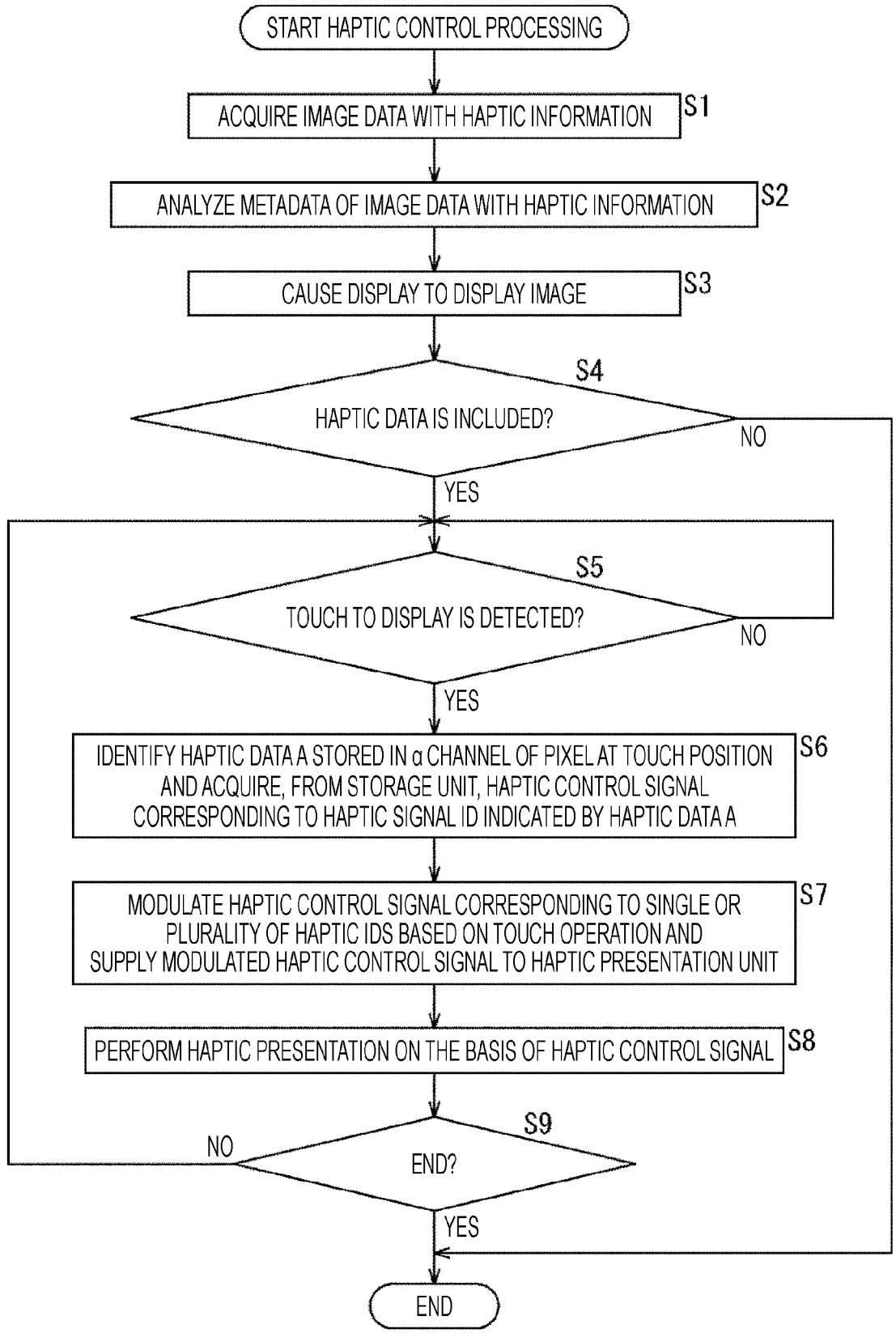
FIG. 11 is a flowchart showing haptic control processing.

Note that a haptic control signal corresponding to the haptic data A (haptic ID) that can be stored in the image is acquired before the start of the processing of FIG. 11 and is stored in the storage unit 43 in advance.

First, in step S1, the communication unit 41 requests image data with haptic information from the server device 12 under the control of the data processing unit 42 and acquires (receives) the image data with haptic information supplied from the server device 12. The acquired image data with haptic information is supplied to the data processing unit 42. Which image data with haptic information is acquired is specified by a user operation. Note that, in a case where the user specifies image data with haptic information stored in the storage unit 43 as a target to be displayed, the image data with haptic information is not acquired from the server device 12, but the image data with haptic information stored in the storage unit 43 is acquired in step S1.

In step S2, the data processing unit 42 analyzes metadata of the header 61 of the image data with haptic information. Specifically, the data processing unit 42 refers to the haptic data flag HAP_FLG stored in the metadata and determines whether or not the haptic data A is stored in the acquired image data with haptic information.

In step S3, the data processing unit 42 supplies an image signal based on texture information of the image data with haptic information to the display 22 and causes the display 22 to display an image. The display 22 displays the image on the basis of an image signal supplied from the data processing unit 42. The image may be a moving image or a still image. In a case where the image to be displayed is a moving image, one or more images forming the moving image are sequentially displayed on the display 22 at a predetermined frame rate after the start of the processing in step S3.

In step S4, the data processing unit 42 determines whether or not the haptic data A is included in the image data with haptic information of the image displayed on the display 22 on the basis of an analysis result of the metadata in step S2.

In a case where it is determined in step S4 that the haptic data A is not included in the image data with haptic information of the image displayed on the display 22, the haptic control processing of FIG. 11 is ended.

Meanwhile, in a case where it is determined in step S4 that the haptic data A is included in the image data with haptic information of the image displayed on the display 22, the processing proceeds to step S5.

In step S5, the data processing unit 42 determines whether or not the user's touch to the display 22 has been detected on the basis of a sensing result from the sensor unit 44 (touch sensor) and repeats the process in step S5 until it is determined that the touch is detected.

Then, in a case where it is determined in step S5 that the user's touch has been detected, the processing proceeds to step S6, and the data processing unit 42 identifies the haptic data A stored in the α channel of a pixel at the user's touch position and acquires, from the storage unit 43, a haptic control signal corresponding to a haptic ID indicated by the haptic data A.

In step S7, the data processing unit 42 modulates a haptic control signal corresponding to a single or a plurality of haptic IDs based on the user's touch operation, such as an operation of tracing the image on the display 22 or an operation of enlarging or reducing the image, and supplies the modulated haptic control signal to the haptic presentation unit 46 (haptic presentation device).

In step S8, the haptic presentation unit 46 performs haptic presentation on the basis of the haptic control signal supplied from the data processing unit 42. Specifically, the piezoelectric actuator 23 serving as the haptic presentation device vibrates a surface of the display 22 touched by the user.

In practice, the processes in steps S6 to S8 are partially executed in parallel.

In step S9, the data processing unit 42 determines whether or not to end the haptic control processing. For example, in a case where an instruction to end an application executing the haptic control processing is issued or in a case where an operation of ending display of the image displayed on the display 22 is performed, the data processing unit 42 determines to end the haptic control processing.

In a case where it is determined in step S9 that the haptic control processing is not to be ended, the data processing unit 42 returns the processing to step S5 and repeatedly executes steps S5 to S9 described above.

Meanwhile, in a case where it is determined in step S9 that the haptic control processing is to be ended, the haptic control processing of FIG. 11 ends.

The haptic control processing by the data processing unit 42 of the smartphone 11 is executed as described above.

Note that, in the haptic control processing described above, a haptic control signal corresponding to the haptic data A (haptic ID) stored in the α channel of each pixel of the image displayed on the display 22 is acquired and stored in the storage unit 43 in advance before the image is displayed.

However, in the process in step S1 of acquiring the image data with haptic information specified by the user from the server device 12, the image data with haptic information and a haptic control signal corresponding to the haptic data A (haptic ID) included in the image data with haptic information may be simultaneously acquired from the server device 12 and be stored in the storage unit 43.

Alternatively, for example, in a case where there is a sufficient margin in a communication band of the network 13 and high-speed communication can be performed between the smartphone 11 and the server device 12, a haptic control signal is not acquired in advance, and instead, at a time when a pixel at a touch position is specified, a haptic control signal corresponding to the haptic ID of the pixel at the touch position may be acquired by accessing the server device 12.

Specifically, it is possible to adopt a method in which a URL that is an access destination of the server device 12, such as "http://haptic.com/?id=", is stored in the metadata of the header 61 and, in a case where the haptic data A (haptic ID) stored in the α channel of a pixel touched by the user is "2", a haptic control signal corresponding to the haptic ID is acquired by accessing the URL "http://haptic.com/?id=2".

In a case where the user performs a tracing operation, the data processing unit 42 can also perform control to predict (pre-read) a moving destination of the tracing operation and acquire a haptic control signal corresponding to the haptic ID of the predicted pixel from the storage unit 43 or the server device 12.

In a case where a haptic control signal corresponding to the haptic ID cannot be acquired in real time due to limitations of a communication speed, a communication cost (communication time), or the like, the haptic control signal that has been acquired before and stored in the storage unit 43 or a cache may be used.

Not only the haptic data A (haptic ID) for controlling the haptic control device but also a sound ID (sound control identification information) for controlling an audio device that outputs sound may be embedded in the α channel of each pixel. For example, 8-bit α channel data may be embedded by assigning 0 to 127 to the haptic ID and 128 to 255 to the sound ID. Alternatively, a value corresponding to a combination of the haptic ID and the sound ID may be embedded. For example, it is possible to embed data corresponding to a combination defined in advance as follows: the α channel data of "1" indicates the haptic ID="1" and the sound ID="1"; and the α channel data of "5" indicates the haptic ID="4" and the sound ID="1".

6. Modification Examples

In the first embodiment described above, the following modification example can be performed.

<Configuration Example where Haptic Presentation Device is Provided for Each Pixel>

In the first embodiment described above, as illustrated in FIG. 3, a single piezoelectric actuator 23 serving as the haptic presentation device is provided for the display 22 and is controlled to vibrate the display 22 to give a haptic sensation to the user by supplying different or the same haptic control signal to the piezoelectric actuator 23 in accordance with a position (pixel position) on an image touched by the user.

Figure 12:
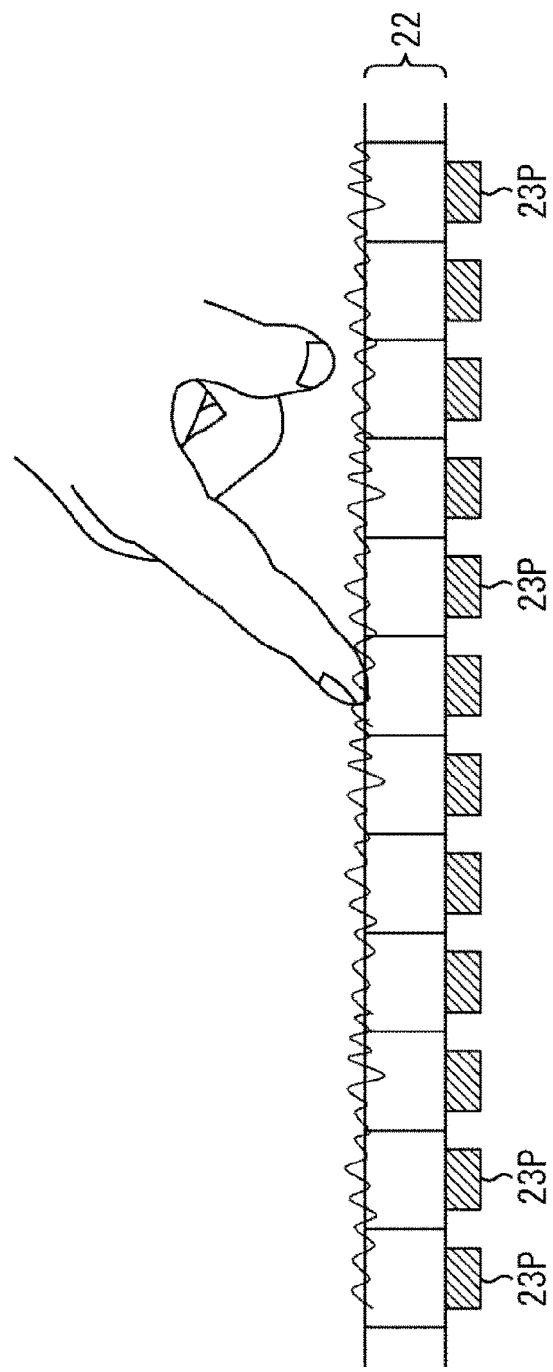
FIG. 12 illustrates a modification example of a haptic presentation device.

Meanwhile, as illustrated in FIG. 12, it is also possible to adopt a device configuration in which piezoelectric actuators 23P that generate vibration are provided in units of pixels of the display 22. In this case, for each of the plurality of pixels including a touch position, the data processing unit 42 can independently supply a haptic control signal corresponding to the haptic ID of each pixel to the piezoelectric actuator 23P to vibrate the piezoelectric actuator 23P. As a matter of course, the piezoelectric actuator 23P may be provided not in units of one pixel but in units of a plurality of pixels.

<Configuration Example where Haptic Presentation Device Other than Display is Provided>

Figure 13:
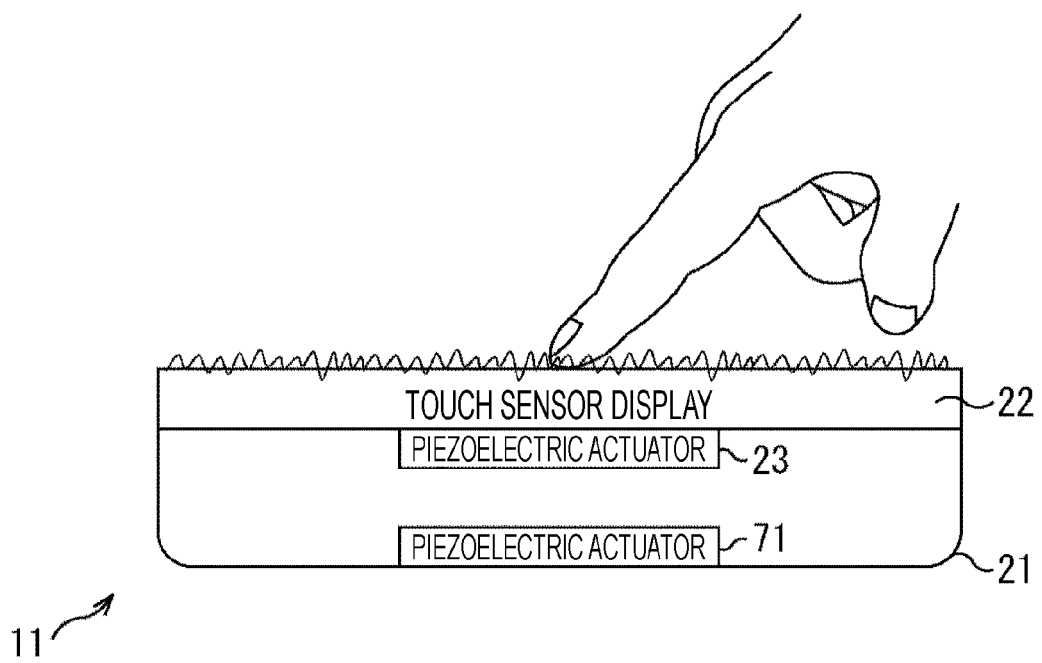
FIG. 13 is another modification example of a haptic presentation device.

As illustrated in FIG. 13, the smartphone 11 may include another piezoelectric actuator 71 in addition to the piezoelectric actuator 23 attached to the back surface of the display 22. The piezoelectric actuator 71 is attached to, for example, the main body (housing) 21 of the smartphone 11.

The user generally grips and holds the main body 21 of the smartphone 11 with one hand and performs a touch operation on the display 22 with the other hand. Therefore, in a case where the piezoelectric actuator 71 is attached to the main body 21, the data processing unit 42 can perform haptic presentation on the hand holding the main body 21, the haptic presentation being different from haptic presentation in response to the touch operation on the display 22.

For example, in a case where the image displayed on the display 22 is a moving image, it is possible to cause the piezoelectric actuator 71 of the main body 21 to perform haptic presentation or the like according to acoustic data (sound data) reproduced together with the moving image.

As described above, haptic data for the haptic presentation according to the touch position at which the image displayed on the display 22 is touched is embedded in the α channel of each pixel in the data 62 of image data of the moving image, the free description area of the header 61 thereof, or the like. Meanwhile, haptic data for the haptic presentation according to the acoustic data (audio data) reproduced together with the moving image can be embedded in a file for the acoustic data.

<On/Off of Haptic Presentation Function>

The data processing unit 42 can turn on or off a haptic presentation function based on haptic control information embedded in the α channel in accordance with a setting condition or the like set by a setting unit (not illustrated). It is possible to turn on or off the haptic presentation function in response to specification by the user and, in addition, to have an autosave function of automatically turning off the haptic presentation function in a case where, for example, a communication speed at which the communication unit 41 performs communication via the network 13 or a remaining battery level of the smartphone 11 falls below a prescribed reference value. In a case where the haptic presentation function is off, the processing of acquiring a haptic control signal corresponding to the haptic ID from the server device 12, the processing of supplying a haptic control signal to the haptic presentation device, the processing of analyzing metadata of image data with haptic information, and the like are stopped.

7. Configuration Example of Second Embodiment of Image Processing System

In the first embodiment described above, all the sensor unit 44 that senses the user's touch position on an image, the image display unit 45 that displays an image of image data with haptic information, and the haptic presentation unit 46 that presents a haptic sensation to the user are provided in the smartphone 11 that is a single information processing device.

However, the sensor unit 44, the image display unit 45, and the haptic presentation unit 46 are not necessarily integrated, and at least one of them may be configured by a plurality of separated devices.

Figure 14:
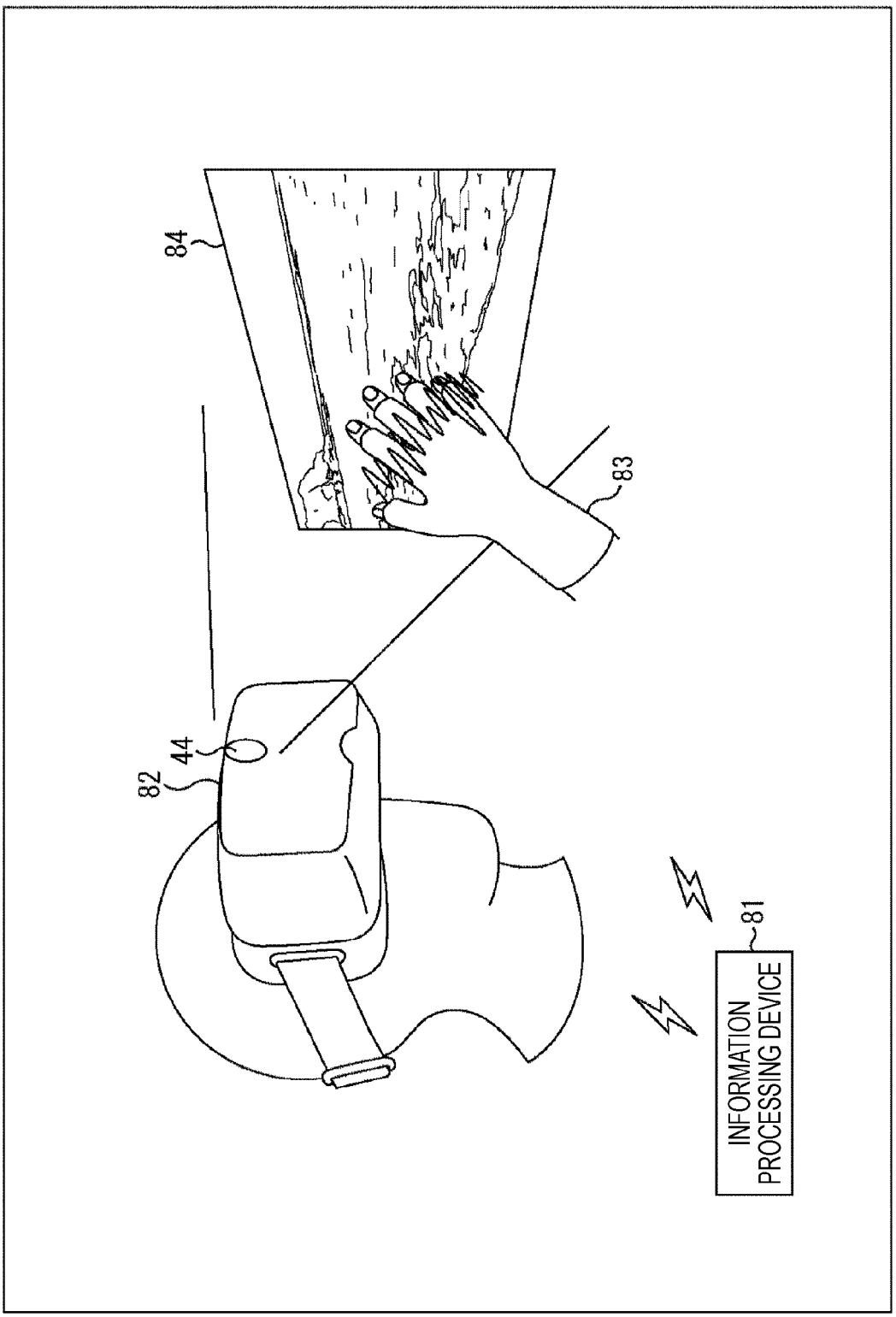
FIG. 14 illustrates a configuration example of a second embodiment of an image processing system to which the present technology is applied.

FIG. 14 illustrates a configuration example of a second embodiment of an image processing system to which the present technology is applied.

In the second embodiment, as illustrated in FIG. 14, a device corresponding to the smartphone 11 in the first embodiment is separated into three devices, i.e., an information processing device 81, a head mounted display 82, and a glove 83.

The information processing device 81 is configured by, for example, a personal computer, a smartphone, a dedicated data processing device, or the like. The information processing device 81 includes the data processing unit 42 described above and acquires image data with haptic information in a predetermined file format to analyze metadata. Then, the information processing device 81 supplies, to the glove 83, a haptic control signal according to a motion of a hand of the user transmitted from the head mounted display 82.

The head mounted display 82 includes the image display unit 45 (not illustrated in FIG. 14) and the sensor unit 44.

The image display unit 45 includes a liquid crystal display, an OLED display, or the like, and displays and presents an image 84 supplied from the information processing device 81 to the user. The image 84 of FIG. 14 is an image corresponding to the image data with haptic information and is an image diagram displayed on the image display unit 45 of the head mounted display 82.

The sensor unit 44 includes, for example, an image sensor that images a front subject, a distance measuring sensor (ToF sensor) that measures a distance from the front subject, and the like. The sensor unit 44 senses movement of the hand of the user wearing the glove 83 and supplies a sensing result to the information processing device 81.

The glove 83 includes the haptic presentation unit 46 and is a haptic presentation device that presents a haptic sensation to the user on the basis of a haptic control signal supplied from the information processing device 81.

The information processing device 81 communicates with the server device 12 and receives image data with haptic information and a haptic control signal corresponding to a haptic ID. The information processing device 81 transmits an image signal of the image 84 corresponding to the image data with haptic information to the head mounted display 82. The head mounted display 82 causes the image display unit 45 to display the image 84 on the basis of the received image signal. When the user moves the hand wearing the glove 83 with respect to the image 84 displayed on the head mounted display 82, the movement is detected by the sensor unit 44 and is transmitted to the information processing device 81. The information processing device 81 transmits, to the glove 83, a haptic control signal corresponding to the haptic data A (haptic ID) of a pixel corresponding to a position of the hand of the user on the image 84. The glove 83 presents a haptic sensation to the user on the basis of the haptic control signal transmitted from the information processing device 81.

The image display unit 45 may be a 3D display that displays an image for the left eye and an image for the right eye to cause the user to stereoscopically perceive an image by using parallax of the two images. The head mounted display 82 realizes a world called virtual reality (VR), augmented reality (AR), or the like.

Examples of an image data format of a 3D object include a first format in which two images for the left and right eyes and a depth image indicating a depth direction are transmitted, a second format in which a three-dimensional position of the object is expressed by a set of points (point cloud) and color information of the object is held corresponding to each point, and a third format in which a three-dimensional position of the object is expressed by connection between vertices called polygon mesh and color information of the object is held corresponding to each polygon mesh as a texture image of a UV coordinate system.

In the first format, for example, it is only required to embed haptic control information (e.g., haptic data A) for controlling the haptic presentation device in the α channel of each pixel for either one of a left-eye image or a right-eye image, as in a case of a two-dimensional image.

In the second format or the third format, haptic control information (e.g., haptic data A) for controlling the haptic presentation device can be embedded corresponding to the points or polygon mesh indicating the three-dimensional position of the object.

Figure 15:
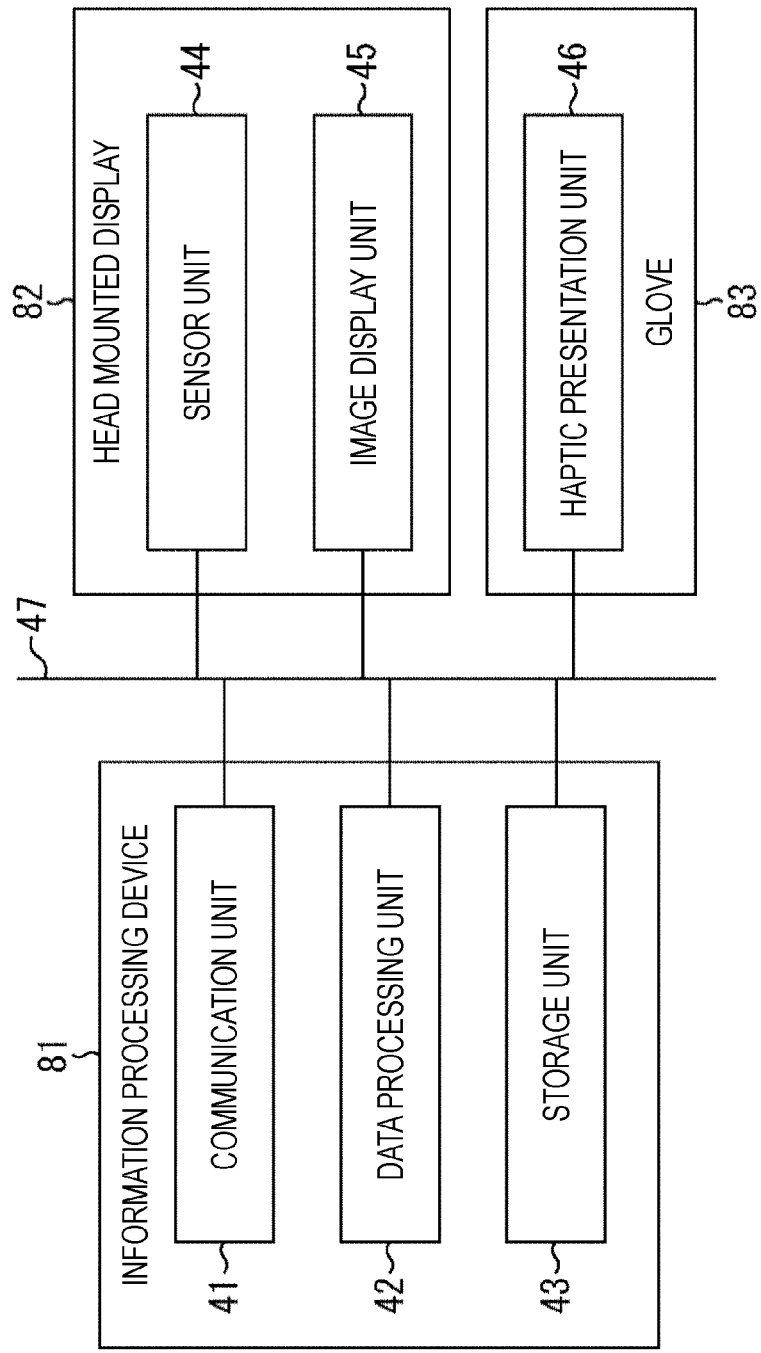
FIG. 15 is a functional block diagram of a second embodiment.

FIG. 15 illustrates a correspondence between the information processing device 81, the head mounted display 82, and the glove 83 of FIG. 14 and the functional blocks of FIG. 4.

As illustrated in FIG. 15, the sensor unit 44 and the image display unit 45 are included in a single device (head mounted display 82), but the sensor unit 44 and the image display unit 45 may be included in separate devices. For example, the sensor unit 44 can be an imaging device such as a stereo camera that images the user wearing the glove 83 and the head mounted display 82 from different viewpoints.

Alternatively, the sensor unit 44 may be integrated with the glove 83 including the haptic presentation unit 46. Specifically, the sensor unit 44 can include an acceleration sensor, a gyro sensor, and the like that estimate a posture of the glove 83 itself and be configured as a part of the glove 83.

The predetermined bus 47 connecting the information processing device 81, the head mounted display 82, and the glove 83 includes a network. The information processing device 81, the head mounted display 82, and the glove 83 can transmit and receive sensing data, a haptic control signal, an image signal, and the like by wireless communication such as, for example, Bluetooth (registered trademark) or Wi-fi (registered trademark). Therefore, the user can feel a more realistic feeling because not only visual information but also haptic information is added.

In a case where the image display unit 45 is included in a device different from a device including the sensor unit 44 or the haptic presentation unit 46 and is only required to have a function of simply displaying an image, the image display unit 45 can be, for example, a display of a television receiver or the like, AR glasses, or the like.

8. Configuration Example of Computer

The series of processing described above can be executed by hardware or software. In a case where the series of processing is executed by software, a program forming the software is installed in a computer. Herein, the computer includes, for example, a microcomputer built in dedicated hardware, a general-purpose personal computer that can execute various functions by installing various programs, and the like.

Figure 16:
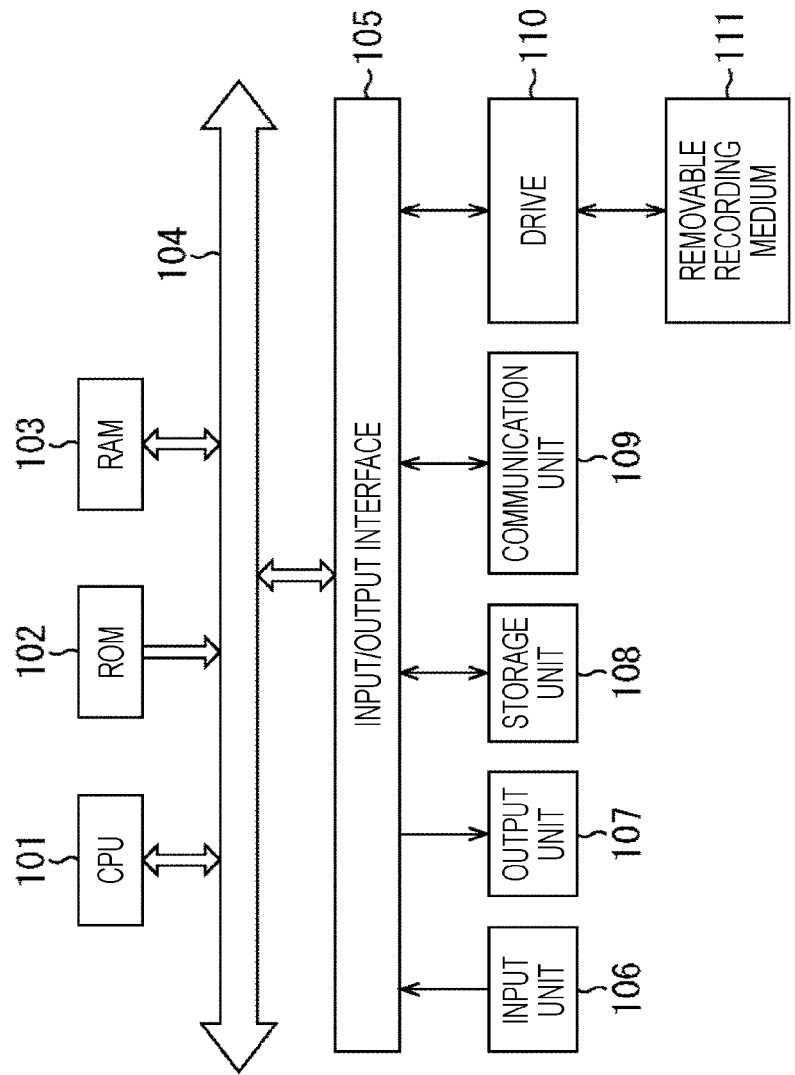
FIG. 16 is a block diagram illustrating a hardware configuration example of a computer.

FIG. 16 is a block diagram illustrating a configuration example of hardware of a computer in a case where the information processing device 81 is configured by the computer.

A central processing unit (CPU) 101, a read only memory (ROM) 102, and a random access memory (RAM) 103 are connected to each other by a bus 104 in the computer.

The bus 104 is further connected to an input/output interface 105. The input/output interface 105 is connected to an input unit 106, an output unit 107, a storage unit 108, a communication unit 109, and a drive 110.

The input unit 106 includes a keyboard, a mouse, a microphone, a touchscreen, an input terminal, and the like. The output unit 107 includes a display, a speaker, an output terminal, and the like. The storage unit 108 includes a hard disk, a RAM disk, a nonvolatile memory, and the like. The communication unit 109 includes a network interface and the like. The drive 110 drives a removable recording medium 111 such as a magnetic disk, an optical disk, a magneto-optical disk, or a semiconductor memory.

In the computer configured as described above, the series of processing described above is performed by, for example, the CPU 101 loading a program stored in the storage unit 108 into the RAM 103 via the input/output interface 105 and the bus 104 and executing the program. The RAM 103 also stores data and the like necessary for the CPU 101 to execute various kinds of processing as appropriate.

The program executed by the computer (CPU 101) can be provided by, for example, being recorded on the removable recording medium 111 serving as a package medium or the like. Further, the program can be provided via a wired or wireless transmission medium such as a local area network, the Internet, or digital satellite broadcasting.

In the computer, the program can be installed in the storage unit 108 via the input/output interface 105 by attaching the removable recording medium 111 to the drive 110. Further, the program can be received by the communication unit 109 via the wired or wireless transmission medium and be installed in the storage unit 108. Further, the program can also be installed in the ROM 102 or storage unit 108 in advance.

Note that the program executed by the computer may be a program in which the processing is performed in time series in the order described in the present specification, or may be a program in which the processing is performed in parallel or at a necessary timing such as when a call is made.

Note that the server device 12 in FIG. 1 can also be configured in a similar manner to the configuration example of the hardware in FIG. 16.

The haptic presentation technology using image data with haptic information of the present disclosure is not limited to the embodiments described above and is applicable to all terminal devices including a display that displays an image and allows the user to perform a touch operation. For example, the present disclosure is also applicable to an information terminal installed in a store such as a convenience store, an automatic teller machine (ATM) of a bank, and the like.

The embodiments of the present technology are not limited to the embodiments described above and can be variously modified without departing from the gist of the present technology.

For example, it is possible to adopt a mode in which all or part of the plurality of embodiments described above is combined.

For example, the present technology can have a configuration of cloud computing in which a single function is shared and jointly processed by a plurality of devices via a network.

As a matter of course, the steps shown in the flowcharts may be performed in time series in the described order, but the steps may not be necessarily processed in time series and may be executed in parallel or at a necessary timing such as when a call is made.

Further, each of the steps described in the above flowchart can be executed by a single device or can be executed by being shared by a plurality of devices.

Further, in a case where a single step includes a plurality of processes, the plurality of processes included in the single step can be executed by a single device or can be executed by being shared by a plurality of devices.

Note that, in this specification, a system means a set of a plurality of components (apparatuses, modules (parts), and the like), and it does not matter whether or not all the components are included in the same housing. Therefore, a plurality of devices included in separate housings and connected via a network and a single device including a plurality of modules in a single housing are both systems.

Note that the effects described in the present specification are merely illustrative and are not limited. Further, effects other than those described in the present specification may be obtained.

Note that the present technology can have the following configurations.

(1)

An information processing device including a data processing unit configured to supply a haptic control signal to a haptic presentation device on the basis of haptic control information embedded in image data in a predetermined file format.

(2)

The information processing device according to (1), in which the data processing unit supplies, to the haptic presentation device, the haptic control signal based on the haptic control information corresponding to a user's touch position on an image displayed on the basis of the image data.

(3)

The information processing device according to (2), in which the data processing unit performs fade-out/fade-in processing of the haptic control signal when the haptic control information corresponding to the touch position is changed due to a change of the image or a change of the touch position.

(4)

The information processing device according to (2) or (3), in which the data processing unit controls at least one of an output level or a pitch of the haptic control signal in accordance with a moving speed of the touch position.

(5)

The information processing device according to any one of (1) to (4), in which the haptic control information is haptic identification information for identifying the haptic control signal.

(6)

The information processing device according to (5), in which the predetermined file format is a file format having an α channel, and the haptic identification information is stored in the α channel.

(7)

The information processing device according to (5) or (6), further including a storage unit configured to store the haptic control signal corresponding to the haptic identification information.

(8)

The information processing device according to any one of (5) to (7), further including a communication unit configured to communicate with another device, in which the data processing unit acquires the haptic control signal corresponding to the haptic identification information from the another device via the communication unit.

(9)

The information processing device according to any one of (1) to (8), in which the haptic control information is stored in units of pixels of the image data.

(10)

The information processing device according to (9), in which in a case where the haptic control information of a pixel has a third value between a first value and a second value in response to enlargement or reduction of an image displayed on the basis of the image data, the data processing unit supplies, to the haptic presentation device, a signal obtained by superimposing the haptic control signal corresponding to the first value and the haptic control signal corresponding to the second value.

(11)

The information processing device according to any one of (1) to (10), in which in a case where the image data in the predetermined file format is image data of a moving image, other haptic control information is also embedded in acoustic data of the moving image.

(12)

The information processing device according to any one of (1) to (11), in which the haptic control information is stored in units of one or more frames of the image data.

(13)

The information processing device according to any one of (1) to (12), in which the haptic control information is stored in units of two or more pixels of the image data.

(14)

The information processing device according to any one of (1) to (13), in which the haptic control information is a haptic stimulation value obtained by quantifying intensity of haptic stimulation, and the data processing unit supplies the haptic control signal corresponding to the haptic stimulation value to the haptic presentation device.

(15)

The information processing device according to any one of (2) to (14), further including:

a sensor unit configured to sense the user's touch position;

an image display unit configured to display the image based on the image data; and the haptic presentation device.

(16)

A server device including:

a storage unit configured to store image data in a predetermined file format in which haptic control information is embedded; and a communication unit configured to transmit the image data to a predetermined information processing device in response to a request from the predetermined information processing device.

(17)

The server device according to (16), in which the haptic control information is haptic identification information for identifying a haptic control signal to be supplied to a haptic presentation device, the storage unit also stores the haptic control signal corresponding to the haptic identification information, and the communication unit transmits the haptic control signal to the predetermined information processing device in response to a request from the predetermined information processing device.

(18)

The server device according to (16) or (17), in which the communication unit receives the image data in the predetermined file format transmitted from another information processing device, and the storage unit stores the received image data in the predetermined file format.

(19)

An information processing method including causing an information processing device to supply a haptic control signal to a haptic presentation device on the basis of haptic control information embedded in image data in a predetermined file format.

(20)

A program for causing a computer to function as a data processing unit configured to supply a haptic control signal to a haptic presentation device on the basis of haptic control information embedded in image data in a predetermined file format.

REFERENCE SIGNS LIST

1 Image processing system
11 Smartphone
12 Server device
13 Network
14 Storage unit
15 Communication unit
21 Main body (Housing)
22 Display
23 Piezoelectric actuator
41 Communication unit
42 Data processing unit
43 Storage unit
44 Sensor unit
45 Image display unit
46 Haptic presentation unit
61 Header
62 Data
63 Pixel data
64 Haptic data
71 Piezoelectric actuator
81 Information processing device
82 Head mounted display
83 Glove
101 CPU
102 ROM
103 RAM
106 Input unit
107 Output unit
108 Storage unit
109 Communication unit
110 Drive

The invention claimed is:

1. An information processing device, comprising:
a data processing unit configured to:
supply a haptic control signal to a haptic presentation device based on first haptic control information embedded in image data in a specific file format, wherein the first haptic control information is stored in units of pixels of the image data;
in a case where the first haptic control information corresponding to a pixel of the image data has a third value between a first value and a second value in response to enlargement or reduction of an image displayed based on the image data, generate a signal by superimposition of the haptic control signal corresponding to the first value and the haptic control signal corresponding to the second value; and
supply the signal to the haptic presentation device.

2. The information processing device according to claim 1, wherein the data processing unit is further configured to supply, to the haptic presentation device, the haptic control signal based on the first haptic control information corresponding to a user's touch position on the image.

3. The information processing device according to claim 2, wherein
the data processing unit is further configured to perform one of fade-out processing or fade-in processing of the haptic control signal based on a change in the first haptic control information corresponding to the user's touch position, and
the change in the first haptic control information is based on one of a change of the image or a change of the user's touch position.

4. The information processing device according to claim 2, wherein the data processing unit is further configured to control at least one of an output level or a pitch of the haptic control signal based on a moving speed of the user's touch position.

5. The information processing device according to claim 2, further comprising:
a sensor unit configured to sense the user's touch position;
an image display unit configured to display the image based on the image data; and
the haptic presentation device.

6. The information processing device according to claim 1, wherein the first haptic control information is haptic identification information for identification of the haptic control signal.

7. The information processing device according to claim 6, wherein
the specific file format is a file format having an α channel, and
the haptic identification information is stored in the α channel.

8. The information processing device according to claim 6, further comprising a storage unit configured to store the haptic control signal corresponding to the haptic identification information.

9. The information processing device according to claim 6, further comprising a communication unit configured to communicate with a specific device, wherein the data processing unit is further configured to acquire the haptic control signal corresponding to the haptic identification information from the specific device via the communication unit.

10. The information processing device according to claim 1, wherein in a case where the image data in the specific file format is image data of a moving image, second haptic control information is also embedded in acoustic data of the moving image.

11. The information processing device according to claim 1, wherein the first haptic control information is stored in units of one or more frames of the image data.

12. The information processing device according to claim 1, wherein the first haptic control information is stored in units of two or more pixels of the image data.

13. The information processing device according to claim 1, wherein
the first haptic control information is a haptic stimulation value obtained by quantification of intensity of haptic stimulation, and
the data processing unit is further configured to supply the haptic control signal corresponding to the haptic stimulation value to the haptic presentation device.

14. A server device, comprising:
a storage unit configured to store image data in a specific file format in which haptic control information is embedded, wherein the haptic control information is stored in units of pixels of the image data; and
a communication unit configured to transmit the image data to a first information processing device in response to a first request from the first information processing device,
wherein in a case where the haptic control information corresponding to a pixel of the image data has a third value between a first value and a second value in response to enlargement or reduction of an image displayed based on the image data, the first information processing device generates a signal by superimposition of a haptic control signal corresponding to the first value and a haptic control signal corresponding to the second value, and supplies the signal to a haptic presentation device.

15. The server device according to claim 14, wherein
the haptic control information is haptic identification information for identification of the haptic control signal to be supplied to the haptic presentation device,
the storage unit is further configured to store the haptic control signal corresponding to the haptic identification information, and
the communication unit is further configured to transmit the haptic control signal to the first information processing device in response to a second request from the first information processing device.

16. The server device according to claim 14, wherein
the communication unit is further configured to receive the image data in the specific file format transmitted from a second information processing device, and
the storage unit is further configured to store the received image data in the specific file format.

17. An information processing method, comprising:
in an information processing device:
supplying a haptic control signal to a haptic presentation device based on haptic control information embedded in image data in a specific file format, wherein the haptic control information is stored in units of pixels of the image data;
in a case where the haptic control information corresponding to a pixel of the image data has a third value between a first value and a second value in response to enlargement or reduction of an image displayed based on the image data, generating a signal by superimposition of the haptic control signal corresponding to the first value and the haptic control signal corresponding to the second value; and
supplying the signal to the haptic presentation device.

18. A non-transitory computer-readable medium having stored thereon, computer-executable instructions that when executed by a processor, causes the processor to execute operations, the operations comprising:
supplying a haptic control signal to a haptic presentation device based on haptic control information embedded in image data in a specific file format, wherein the haptic control information is stored in units of pixels of the image data;
in a case where the haptic control information corresponding to a pixel of the image data has a third value between a first value and a second value in response to enlargement or reduction of an image displayed based on the image data, generating a signal by superimposition of the haptic control signal corresponding to the first value and the haptic control signal corresponding to the second value; and
supplying the signal to the haptic presentation device.

* * * * *